US007455246B2

(12) United States Patent
Roth et al.

(10) Patent No.: US 7,455,246 B2
(45) Date of Patent: Nov. 25, 2008

(54) JANITORIAL HANDCART WITH CHEMICAL APPLICATION APPARATUS

(76) Inventors: Blake H. Roth, 2102 Shannon La., St. Joseph, MO (US) 64506; Jeff Hower, 1020 Lake Viking Ter., Altamont, MO (US) 64620; Joseph Kauth, 8926 W. 132nd Pl., Overland Park, KS (US) 66213; Rocky Massin, 2321 Lovers La., St. Joseph, MO (US) 64505; Craig Snider, 3104 Hampton Rd., St. Joseph, MO (US) 64505; William Randall Roth, 1221 N. 25th St., St. Joseph, MO (US) 64506; Jeff Haag, 21020 654th Ave., Litchfield, MN (US) 55355; Darrin Swagel, 3333 Zarthan Ave. S., St. Louis Park, MN (US) 55416; Jim Decker, 1017 Royal Birch La., Las Vegas, NV (US) 89144

( * ) Notice: Subject to any disclaimer, the term of this patent is extended or adjusted under 35 U.S.C. 154(b) by 0 days.

(21) Appl. No.: 11/706,540

(22) Filed: Feb. 15, 2007

(65) Prior Publication Data

US 2007/0187528 A1 Aug. 16, 2007

Related U.S. Application Data

(60) Provisional application No. 60/773,438, filed on Feb. 15, 2006.

(51) Int. Cl.
*A01G 25/09* (2006.01)

(52) U.S. Cl. ........................ 239/146; 239/303; 239/149; 239/172; 239/289; 222/609

(58) Field of Classification Search ................. 239/146, 239/149, 172, 302–305, 289; 222/609, 626
See application file for complete search history.

(56) References Cited

U.S. PATENT DOCUMENTS

| | | | | |
|---|---|---|---|---|
| 5,029,758 | A * | 7/1991 | Chayer | 239/172 |
| 5,360,307 | A * | 11/1994 | Schemm et al. | 414/343 |
| 6,446,881 | B1 * | 9/2002 | You | 239/146 |
| 6,595,438 | B2 * | 7/2003 | You | 239/146 |

* cited by examiner

*Primary Examiner*—Dinh Q Nguyen
(74) *Attorney, Agent, or Firm*—Shughart Thomson & Kilroy PC

(57) ABSTRACT

A wheeled handcart is provided having a rechargeable, battery-powered, low pressure pump and spray apparatus for applying chemical cleaning solutions to sanitize commercial restroom facilitates and for filling hand applicators with diluted chemical solutions.

16 Claims, 5 Drawing Sheets

JANITORIAL HANDCART WITH CHEMICAL APPLICATION APPARATUS

CROSS REFERENCE TO RELATED APPLICATION

This application claims priority under 35 U.S.C. 119(e) and 37 C.F.R. 1.78(a)(4) based upon copending U.S. Provisional Application Ser. No. 60/773,438 for Janitorial Handcart With Chemical Application Apparatus filed Feb. 15, 2006 the specification of which is incorporated herein by reference.

FIELD OF THE INVENTION

The invention relates generally to a hand cart used in the cleaning of commercial restrooms and, in particular, to wheeled, manually propelled carts capable of efficiently storing and organizing the necessary tools for normal cleaning activities.

The present invention relates more specifically to those handcarts that are capable of carrying and delivering, via a pump and spray or other similar system, chemicals and cleaning solvents and supply of a diluent, such as water, necessary to sanitize restroom facilities while also serving as a storage unit for various other standard cleaning supplies and tools.

Handcarts of this kind contain a reservoir of fresh water and a supply of chemical product which are mixed together to form a cleaning solvent. The cleaning solvent is then applied via a distribution system often involving a hand or electric pump to aid in the sanitation of restroom facilities.

BACKGROUND OF THE INVENTION

In typical commercial restroom cleaning handcarts, the primary source of power is external. The need to plug in most commercial restroom cleaning handcarts reduces efficiency by increasing set-up and tear-down time, leaving less time for actually cleaning. Additionally, the dependence upon an outside power source may render some units obsolete in areas that do not provide an external power source.

Another common problem with commercial restroom cleaning handcarts is use of too high of a spray pressure which results in the application of excess chemical cleaning solutions due to a high pressure pumping apparatus. Such high pressure pump resulting in over application wastes both chemical and water resources and reduces overall efficiency by increasing the number of times the handcart must be reloaded with chemical or fresh water.

A further problem with existing commercial restroom cleaning handcarts is the use to too high of a spray pressure itself. When too much spray pressure is used, the water and cleaning solution mixture and even plain rinse water is forced by the high pressure into cracks in the walls and floors and forced deep into the grout between tiles. Such infusion of moisture into cracks and grout results in moisture being in areas that should be kept dry and causes growth of mold and mildew and destruction of the floors and walls by causing the tile to separate from its base layer or foundation.

Yet another problem of existing commercial restroom cleaning and solution and rinse applying devices is the inclusion of wet/dry vacuum pickups in the devices. The high noise level generated by these devices—approximately 80 decibels—is too great to allow use of these devices in hospital, school, library and other "quite zone" areas. Therefore it would be a benefit to have available a device that did not generate the excess noise inherent in the wet/dry vacuum pickups of prior art devices.

It is an advantageous feature for all commercial restroom cleaning carts if they operate under their own power and properly supply the right amount of cleaning solution so as to optimize chemical usage and user efficiency.

The present invention provides a means by which operators of commercial restroom cleaning handcarts can increase utility and efficiency by making use of a battery powered handcart having an on-board battery charger or trickle charger which permits the on-board battery to conveniently and efficiently be recharged during periods of non-use of the handcart.

The present invention provides a means by which operators of commercial restroom cleaning handcarts can increase the efficiency and reduce the costs associated with waste through over-application by making use of the low pressure pump and applicator for application or chemical solutions and rinse water.

An on-board bottle filler device also is provided which allows dilution of the on-board chemical concentrate by the on-board water supply into a diluted chemical solution and diversion of the diluted chemical solution to the bottle filler device which permits the user to fill and refill containers, such as quart bottles, for use in cleaning procedures.

The foregoing expresses limitations known to exist in present commercial cleaning handcarts. Thus, it becomes advantageous to provide a an alternative designed to overcome one or more of the above listed limitations. Therefore, a suitable alternative, with features more fully described hereafter, is provided.

SUMMARY OF THE INVENTION

The invention provides for a means of restroom sanitation which makes the cleaning process faster, more effective and more efficient through eliminating reliance upon external power sources and reducing overspray and waste by utilizing a low pressure pump to deliver the correct amount of cleaning solution. The apparatus employs a rechargeable battery, reducing set-up time and allowing the unit to be used in facilities which do not have electrical outlets. Further, the apparatus is equipped with a low pressure spray delivery system which is designed to deliver the proper amount of cleaning solution eliminating over-saturation and waste, saving both water and chemicals, and increasing efficiency by reducing set-up and recovery time.

Therefore, it is an object of the present invention to provide a fully portable, self-powered unit to aid in the sanitation of commercial restroom facilities.

Yet another object of the present invention is to increase cleaning efficiency and reduce waste by utilizing a low-pressure pump to deliver the proper amount of cleaning solution.

Yet another object of the present invention is to increase cleaning efficiency and reduce waste by providing an onboard battery recharging unit and a bottle filler unit for hand application of solutions.

The foregoing and other aspects will become apparent from the following detailed description of the invention when considered in conjunction with the accompanying drawing figures.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention.

DESCRIPTION OF THE DRAWINGS

Preferred embodiments of the invention, illustrative of the best modes in which the applicant has contemplated applying the principles, are set-forth in the following description and are shown in the drawings and are particularly and distinctly pointed out and set forth in the appended claims.

DESCRIPTION OF THE PREFERRED EMBODIMENT

As required, detailed embodiments of the present inventions are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
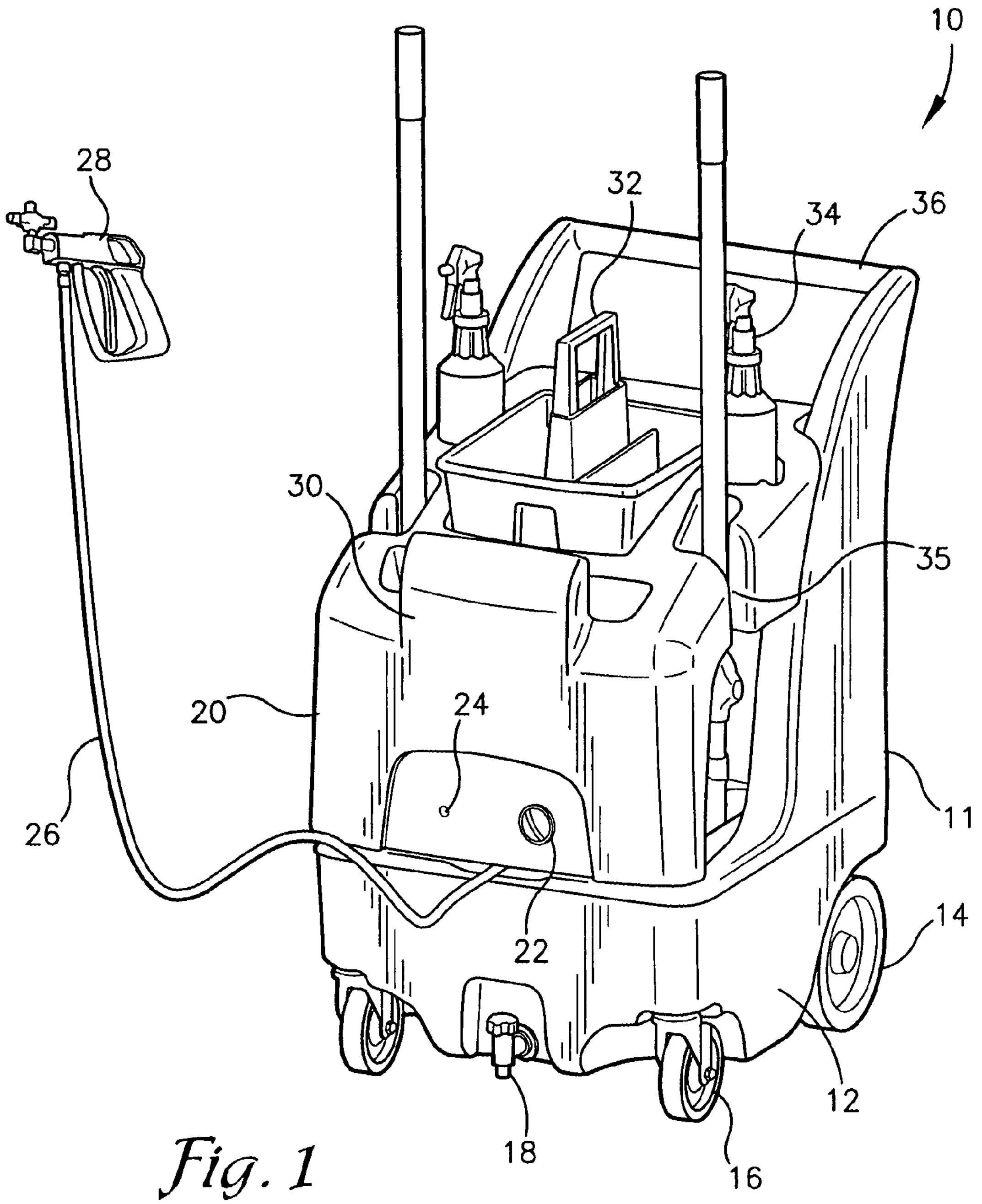
FIG. 1 is a front right side perspective view of an embodiment of the cleaning apparatus.

Referring now to FIG. 1, an embodiment 10 is shown in front and right side view and presenting a base 11 and a face plate 20. The base 11 of the janitorial cart 10 contains a hollow space in base 11 used as a fresh water reservoir 12.

The rear of the base 11 extends upward along the back of FIG. 1 in a uni-body construction to form a handle 36 and to give overall shape to the handcart 10. Attached to the exterior bottom of the base 11 in the present embodiment are two fixed axle rear wheels 14 and two freely pivoting front wheels 16. The front wheels 16 are allowed to complete 360 degree rotations facilitating better control and steering of the cart. To provide a simple, efficient means for draining the fresh water reservoir b the apparatus 10 has been equipped with a drain spout 18. The drain spout 18 is located on the base 11 below the face plate 20 and between the two front wheels 16.

Figure 3:
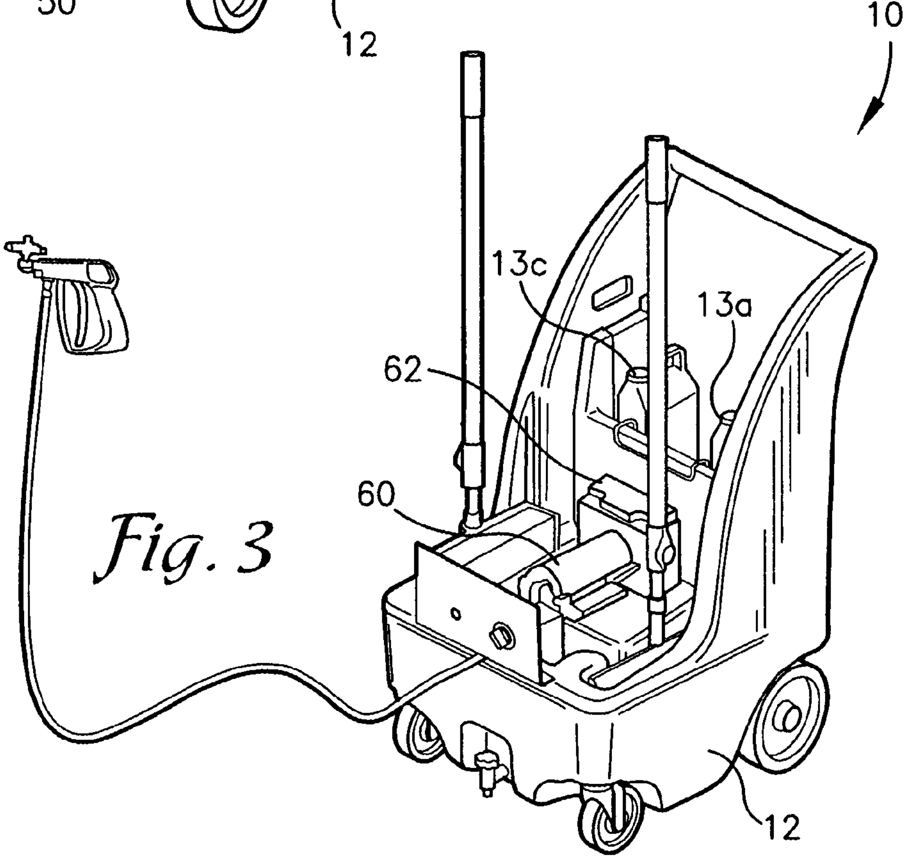
FIG. 3 is a front right side perspective view of the embodiment of FIGS. 1 and 2 with the front face plate and holders removed.

The embodiment 10 contains a removable face plate 20. FIG. 3 shows a view of the apparatus 10 with face plate 20 (FIG. 1) removed. Just below the removable face plate 20 are a chemical selector valve 22 and an on/off power switch 24.

The chemical selector valve 22 allows the user to choose between two readily available chemical products. Once a chemical has been selected using chemical selector valve 22, the embodiment 10 allows for the application of the selected chemical, mixed with water from the fresh water reservoir 12, through the use of hose 26 and the spray gun applicator 28. Such application device consisting of hose 26 and spray gun 28 extending from the front of said device 10 between the base 11 and face plate 20. Spray gun 28 contains two nozzles providing two spray settings allowing user to select between chemical solution or rinse spray applications.

When not in use, hose 26 and spray gun 28 are stored in hose storage space 30 located at the top of face plate 20. Located behind and adjacent to the hose storage 30 at the top of the face plate is the removable tool caddy 32. The tool caddy 32 is removable from the base unit and rests on the top of face plate 20. The tool caddy 32 may be used to carry small items such as towels, rags, dustpans, small tools, brushes, etc.

As it is not always practicable or necessary to use all of the chemical application capabilities of the cart 10, the present embodiment provides for storage and easy access to portable cleaning solution spray bottles for smaller areas of need. Located adjacent to and on either side of the removable tool caddy 32 are two circular storage spaces 34 designed to hold portable spray bottles.

Adjacent to both the tool caddy 32 and the storage space 34 are two handle holders 35 one on either side of the face plate designed to hold the handles of tool such as mops, brushes, brooms, etc., while the heads of such tools rest on the base of FIG. 10 beneath the face plate 20.

Figure 2:
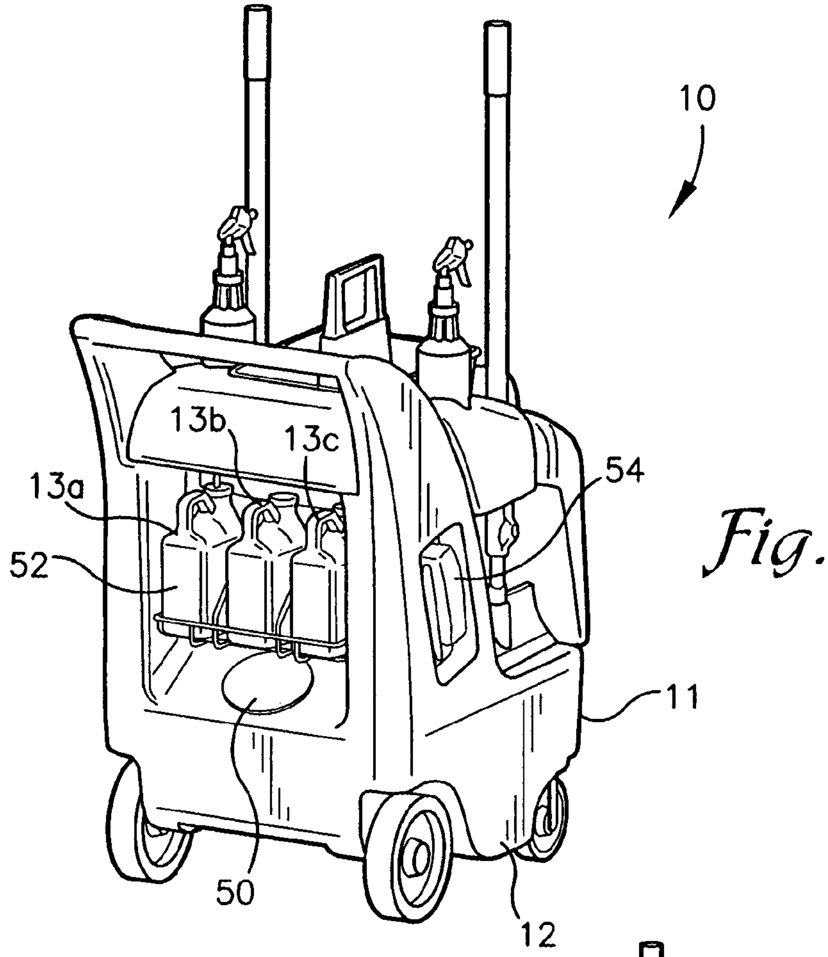
FIG. 2 is rear left side perspective view of the embodiment of FIG. 1.

Referring now to FIG. 2, the embodiment 10 is shown in rear left view. FIG. 2 shows a water fill port 50 on the rear side of the base 11 just below handle 36. The water fill port 50 allows for clean water to be poured into the fresh water reservoir 12. Fresh water is poured through the water fill port 50 and stored in the fresh water reservoir 12 until it is sprayed as rinse water or combined with chemicals from the chemical storage unit 52 and applied through hose 26 and spray gun 28 (FIG. 1).

To increase the efficiency and effectiveness of the user, the present invention allows for the storage and readiness of multiple separate chemical cleaning concentrate materials. Located in the rear of the base 11 just above the water fill port 50 is the chemical storage space 52 containing chemical concentrate containers 13*a,b,c*. Chemicals kept in the chemical storage space 52 remain in their original containers and are connected to the embodiment 10 by removing the shipping cap and seal on each bottle and attaching a chemical feed line to the bottle by screwing the cap on the line to the bottle.

Again referring to FIG. 2, it is of further advantage to increase the efficiency of the user by allowing for the "one touch" choice between multiple separate cleaning solutions 13*a,b,c* by use of selector switch 22. To this end, the embodiment 10 allows for placement of multiple containers of chemical concentrate 13*a,b,c* within the chemical storage space 52. Depending on the size of the chemical containers, chemical storage space 52 also may allow for the transport of additional chemical containers which are not connected for immediate application use. The multiple active chemicals concentrate containers stored in chemical container space 52 are connected through the chemical feed line and may be selected using the chemical selector valve 22 (FIG. 1). Chemicals from the chemical storage area 52 are mixed with fresh water from the fresh water reservoir 12 and ultimately distributed through the hose 26 and the spray gun 28 (FIG. 1).

A primary advantage gained by the present apparatus 10 is the increased mobility and efficiency achieved through the use of a battery 62 (FIG. 3) to power the pump 60 allowing the user to enjoy the great advantage achieved when the unit can be operated without relying on, or connecting to, an external power source.

The battery 62 is recharged through a battery charger 54. In one embodiment the battery charger 54 is accessed and found on the left side of base 11 of the unit 10 (FIG. 2) in the alternative, the battery charter may be positioned within base 11 and out of external view. By plugging the battery charger 54 into an external power source, the battery shown in FIG. 3 can be fully recharged. In the present embodiment 10, the battery charger 54 has two separate rows of lights. The top row indicates the status of the battery. The bottom row of lights indicates the charger's function. The battery charger 54 is permanently connected to the battery 62.

Referring now to FIG. 3 a front and right side view of the apparatus 10 is shown with the face plate 20 removed showing only the base 11 of the unit. Removal of the face plate 20 allows access to the pump 60 and the battery 62. Attached to the base 11 above the fresh water reservoir 12 is the pump 60. At the rear of the pump 60 is the battery 62 which, provides power to the pump.

Again referring to FIG. 3, the pump 60 provides pressure which expels combination of water from the fresh water reservoir 12 and chemicals from the chemical source containers 52 (FIG. 1). The specially calibrated pump provides a low pressure and low volume flow rate and delivers the proper amount or proper dilution of solution while eliminating over saturation with chemicals and waste of water, chemicals. In a preferred embodiment, chemical application pressure created by the pump 60 and distributed through the hose 26 (FIG. 1) and spray gun 28 (FIG. 1) is about 65-75 PSI, while the pump flow rate is ½ gallon per minute. During rinsing applications the application pressure created by the pump 60 is about 100-120 PSI. The efficiency advantage provided by the low flow rate is enhanced in the present embodiment by the high capacity of the fresh water reservoir 12. The low pressure pump 60 and the fresh water reservoir 12 combine to provide up to 28 minutes of run time without stopping to refill. The low application and rinse pressure avoids the problems created by higher pressure applicators which, as previously described, can force solutions and water into cracks and behind tile work an result in mold, mildew and the destruction of the connection between the tile work and the floor or wall of the building. As stated, the low pressure and low volume of a preferred embodiment produces a flow rate of about ½ gallon per minute which is about half the volume of prior art devices. And this flow rate is achieved at about ⅓ the deliver pressure of the solution against the building surfaces thus protecting the structure from mold, mildew and tile damage. A further benefit is achieved by the low pressure and low volume operation as the same amount of cleaning and same amount of operator time is involved with the low pressure and low volume device while reducing the waste of materials and need to clean up only one half of the applied chemical and/or rinse water while achieving the same cleaning benefit.

As previously mentioned, the present embodiment operates more quietly as it does not include any type of vacuum pick-up device as do many prior art devices. As a result of this change and by use of the low pressure/low volume pump, the present embodiment operates at just over 65 decibels—or about the same volume of sound as a typical conversation—therefore making the present embodiment suitable for use in "quite zone" areas such as schools and hospitals.

In one embodiment the dilution of the chemical concentrate is controlled by the use of specifically sized draw tubes or straws contained within the bottles of chemical concentrate. In this manner the user is not confronted by the need to calculate dilutions or to modify valves or change flow rates to accommodate the different chemicals used with the apparatus 10. Such bottles of chemical concentrate, having specifically sized draw tubes or straws contained within the bottles are known within the art as "F-type" bottles.

Figure 4:
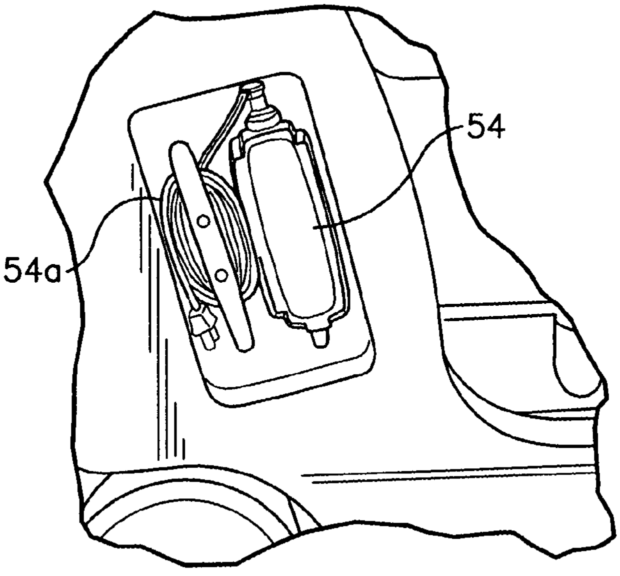
FIG. 4 is a close-up view of the battery charger and cord provided to maintain the on-board battery in operable condition.

FIG. 4 is a fragmentary left side view of the apparatus of FIG. 1 and showing the location of the battery charger or battery trickle charger device 54 with its associated power cord 54*a* to permit connection of the battery charger to an electrical outlet. In operation, when the cleaning apparatus 10 is out of service, usually while it is in overnight storage, the onboard battery 62 may be recharged by inserting power cord 54*a* into a wall electrical outlet thereby allowing trickle charger 54 to recharge the battery for continued use during the next cleaning cycle. It will be appreciated by those skilled in the art that as power outlets are frequently unavailable in restrooms, and in those of public buildings in particular, that the utility and need for an onboard battery power supply is highly desirable for apparatus 10 and the provision for recharging of the battery during out of service periods in a convenient, fool proof manner is essential for satisfactory operation of apparatus 10.

Figure 5:
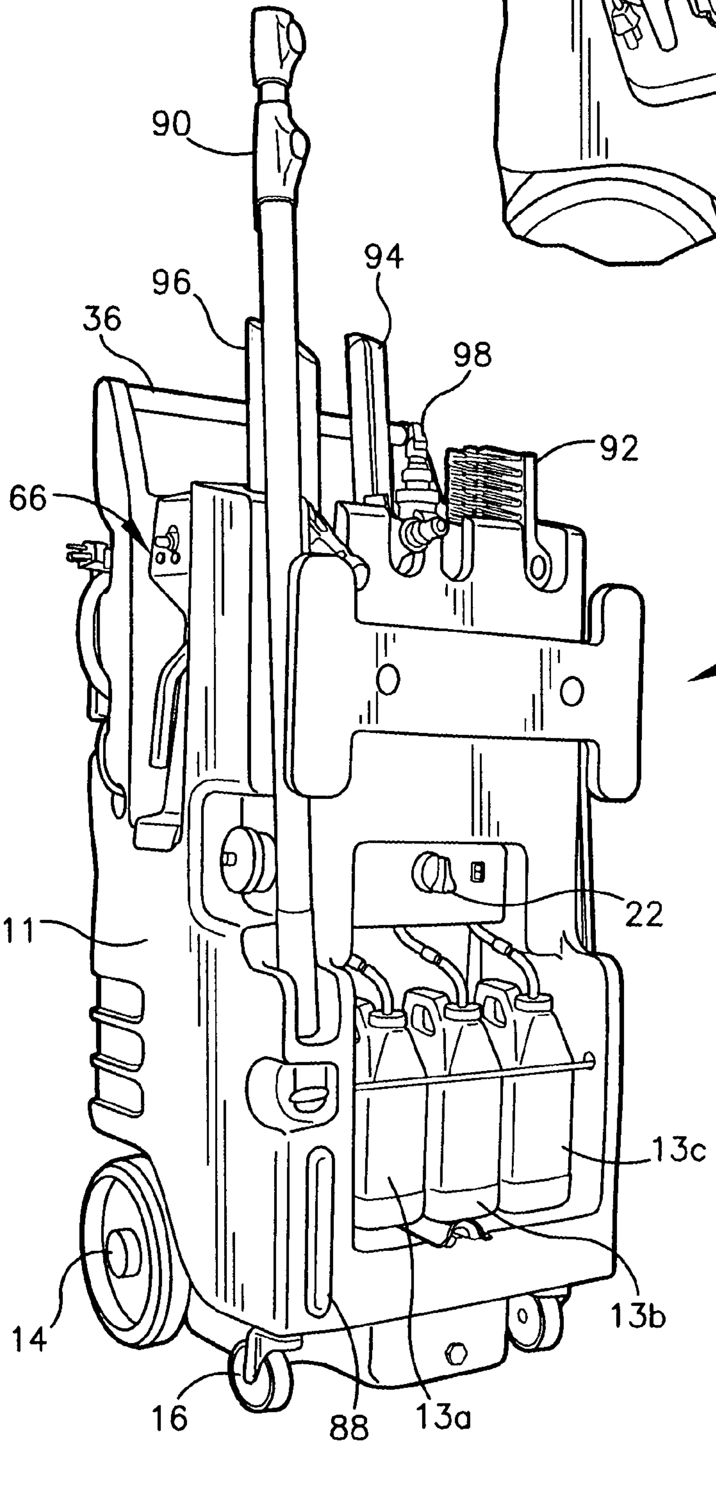
FIG. 5 is a front and left side perspective view of an alternate embodiment of the cleaning apparatus.
Figure 6:
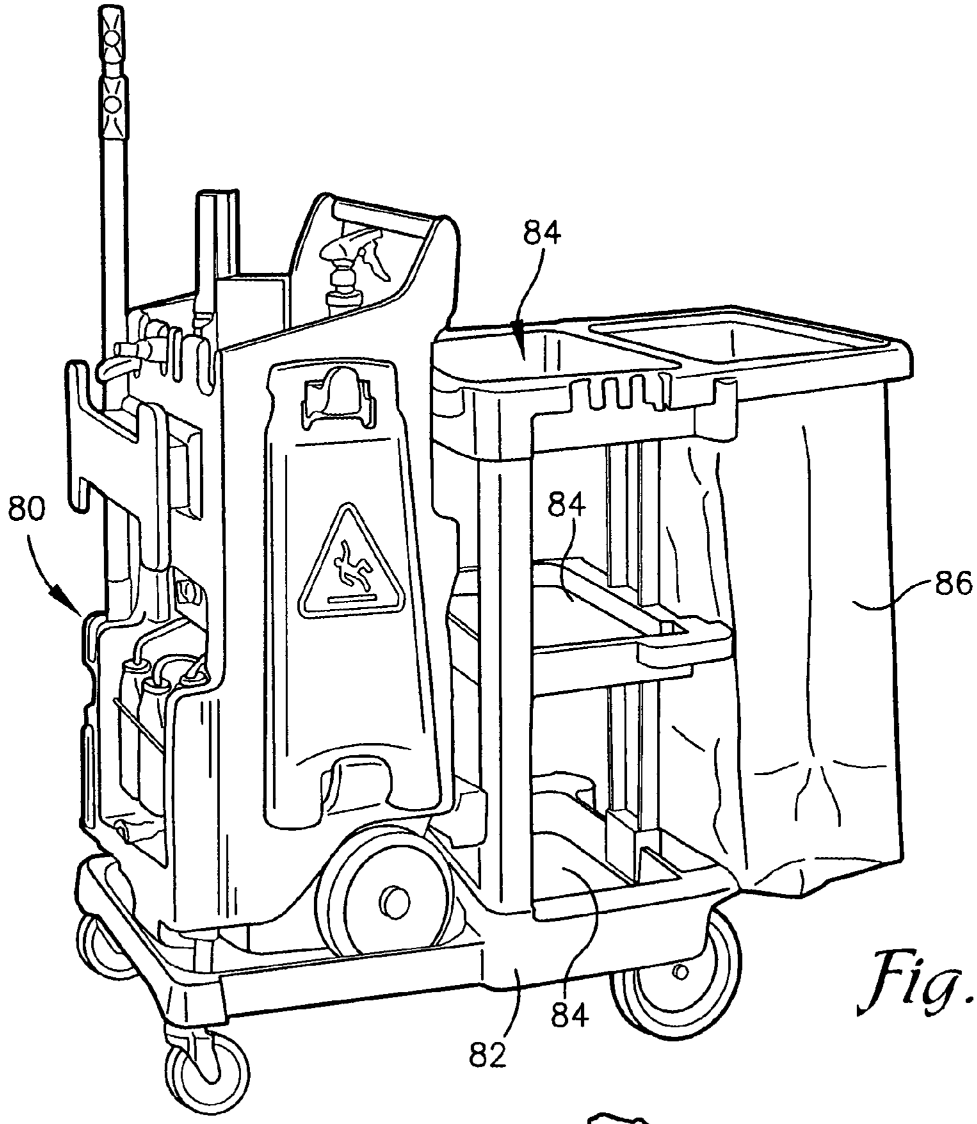
FIG. 6 is a front right side perspective view of the embodiment of FIG. 5.

Referring now to FIG. 5, an alternate embodiment of apparatus 10 is shown which, for convenience, will be referred to as apparatus 80. Apparatus 80 contains many of the features of apparatus 10 but in a reconfigured arrangement. Therefore, similar features which appear on both apparatus 80 and apparatus 10 may be identified by similar reference numbers. Apparatus 80 is generally configured as a cart structure having a cart base 11 which is supported by rear wheels 14 and pivoting front wheels 16 to allow convenient movement of apparatus 80 by use of handle 36 by an operator. It will be appreciated by those skilled in the art, and by reference to FIG. 6, that apparatus 80 is mountable on a typical four-wheel janitorial cart 82 which permits apparatus 80 to be moved about a building from one area to another in conjunction with other janitorial supplies stocked on cart 82. Such a cart 82 may be provided with multiple shelf-type storage areas 84 as well as a container for dry trash 86.

Again referring to FIG. 5, apparatus 80 is provided with a connection for hose 26 which terminates in spray gun 28 for use in applying rinse water and dilute solutions of chemical concentrates 13*a, b, c*. As previously described, apparatus 80 is provided with a selector switch 22 which permits the user to choose between the various chemical concentrate solutions 13*a, b, c* which are stored on cart 80 for dilution by the onboard water supply contained within base 11 of apparatus 80. As previously described, it will be appreciated that the user changes the position of selector switch 22 to choose between one of chemical concentrate solutions 13*a, b, c* which is then coupled to the onboard pump 60 to which the onboard water supply also is connected to allow for dilution of the chemical concentrates 13*a, b, c* prior to their being pumped through hose 26 for delivery to spray gun 28. For user convenience, apparatus 80 also is provided with a water level gauge or water level monitor device 88 which allows the user to observe, generally, the quantity of onboard water supply remaining in apparatus 80 during the course of use of apparatus 80 in cleaning bathroom and other facilities. For additional convenience in addressing a full range of cleaning options, apparatus 80 is provided with a variable length handle 90 to which various heads may be applied such as a brush head 92 or a squeegee head 94 or a sponge head 96. It will also be appreciated that a mop head (not shown) may be attached to handle 90. Apparatus 80 further is provided with a filler unit 66 which will be described hereinafter in conjunction with FIG. 7. Bottle filler 66 is of benefit to the user when the need to refill a hand applicator quart bottle 98 is confronted.

In operating apparatus 80 or apparatus 10, the user first attaches spray gun 28 and hose 26 to the apparatus and then fills the onboard water supply tank with cool tap water. Chemical concentrate containers 13*a,b,c* are positioned on apparatus 80 and the shipping caps are removed from containers 13*a,b,c* and the chemical feed lines are connected to each container by attaching the line to the draw straw that is selected for use with the particular bottle of chemical concentrate to provide the correct dilution rate as concentrate is pumped from the bottle of concentrate 13*a,b,c* and into the pump. The user should then perform initial priming of apparatus 10, 80 by selecting the desired chemical concentrate 13*a,b,c* by use of chemical selector switch 22. The power switch 24 for apparatus 10, 80 is then set to the on position to begin operation of the pump whereupon the pump will begin operation until the proper discharge pressure is achieved. The user should then direct the spray gun 28 towards a drain or other container and pull the spray gun trigger to release a sufficient volume of liquid until a steady spray pattern is achieved. Once the proper spray pattern has been achieved, the trigger of gun 28 may be released whereupon the user should turn selector 22 to other chemical concentrate products 13*a, b,* or *c* not yet primed and repeat the priming procedure for those products.

During normal operation, the power switch 24 for the device 10, 80 is turned to the on position whereupon the pump is operational and the spray gun 28 is ready to spray the selected dilute form of the chemical concentrate contained in containers 13*a, b, c* upon depressing of the trigger attached to spray gun 28. Spray gun 28 is provided with two spray nozzles. A first spray nozzle being used for application of diluted chemical solutions and the second nozzle being used rinsing the areas after chemical solutions have been applied. The rinse spray pattern is a fine spray pattern while the chemical application pattern is a courser pattern.

Figure 7:
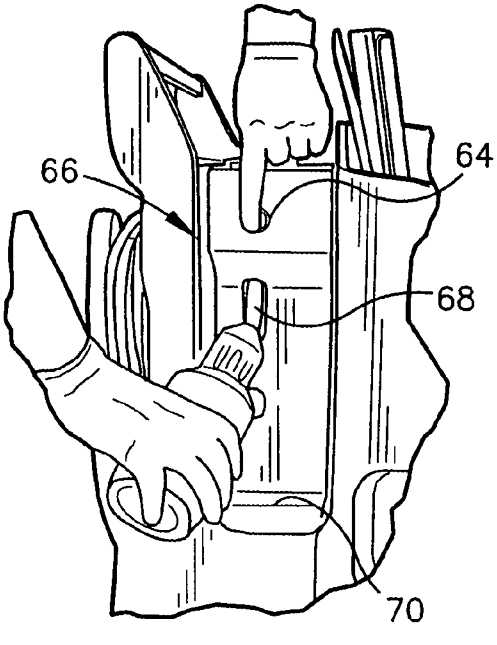
FIG. 7 is a fragmentary view of the left side of the embodiment of FIG. 5 showing the bottle filler unit with the diverter in the form of a push button mechanism and having a drip-tray below the bottle filler unit to catch liquid that may drip from the bottle filler.

Referring now to FIG. 7, a fragmentary view of the left side of the embodiment of FIG. 5 is shown to better present the bottle filler unit 66 of the embodiment. The bottle filler unit 66 is included so the user may fill and refill hand-sized bottles—such a quart bottles—with a diluted form of the chemical concentrate solutions that are on-board the apparatus 10 (FIG. 5). It will be appreciated by those skilled in the art that often it will be useful to cease use of the spray gun 28 and to instead apply cleansing solutions with a hand applicator to achieve more localized application of a cleansing solution. As the cleansing solution in the hand applicator, usually a small bottle such as a quart bottle, is the same diluted chemical as is applied by spray gun 28, it would be beneficial to be able to fill and refill such a hand applicator with the dilute chemical solution as is prepared by apparatus 10 for pressure application from spray gun 28. As it would be inconvenient, difficult and messy to attempt to refill hand applicator bottles from spray gun 28, the apparatus 10 is provided with a diverter 64 in the form of a push button mechanism which interrupts the flow of diluted solution into hose 26 and out spray gun 28. Activation of diverter 64 sends the diluted solution from the pump to the bottle filler unit 66. Filler unit which is provided with fill tube 68 onto which a hand applicator, such as a quart bottle may be applied. In the present embodiment, so long as diverter 64 is depressed, diluted solution will flow from filler unit 66 through fill tube 68 and into the hand applicator bottle placed onto fill tube 68. As some liquid may be retained on fill tube 68 after the hand applicator bottle has been removed, a drip-tray 70 is provided below the bottle filler unit 66 to catch and retain any liquid that may drip from the bottle filler unit 66 or fill tube 68.

Figure 8:
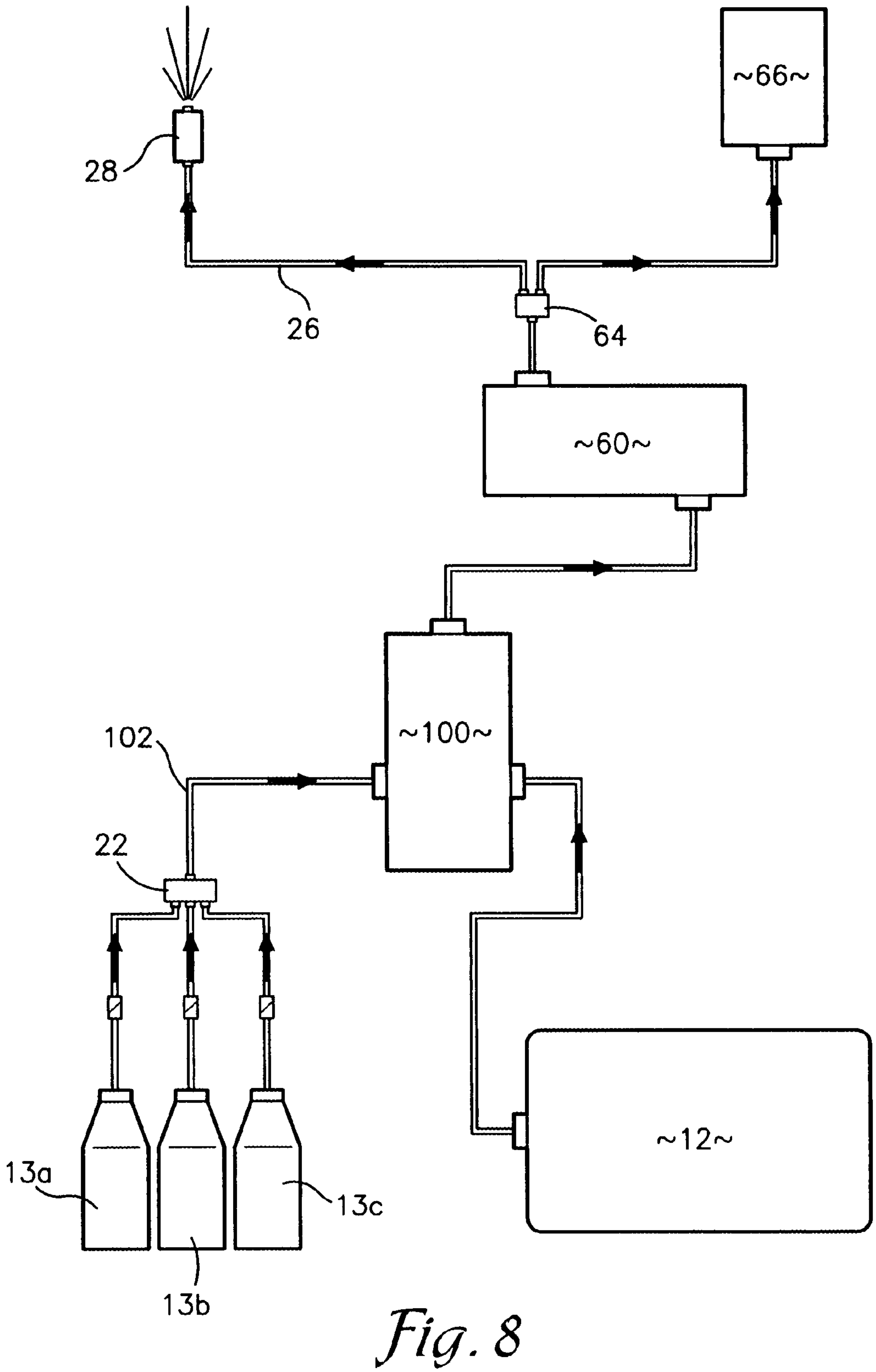
FIG. 8 is a diagrammatic representation of the operational connections between portions of the cleaning apparatus.

Referring now to FIG. 8, the general interrelationship of the various components and the flow of materials through the device will be described in general. As previously described, the onboard chemical concentrate solutions 13*a, b, c* are connected by supply lines to selector 22. This permits the user to choose between the plurality of chemical concentrate solutions 13*a, b, c*. The apparatus 10, 80 also provides an onboard water supply 12 which is used to dilute the chemical concentrate solutions 13*a, b, c* as they are pulled from their containers and into pump 60 for pressured application through hose 26 and spray gun 28. The dilution of the chemical concentrate solutions is achieved by the use of a venturi assembly 100 to generate a vacuum on the chemical supply line 102 which connects selector 22 to the venturi 100. As pump 60 pulls water from the fresh water reservoir 12 through venturi 100, a low pressure or slight vacuum is created on line 102 which serves to draw the concentrate chemical solution selected 13*a*, 13*b* or 13*c* into the venturi 100 where it is diluted to the proper strength as determined by the particular straw mounted in the concentrate chemical container 13*a, b, c*. Therefore, a diluted solution is provided to pump 60 which then ejects the material through hose 26 to spray gun 28. In the alternative, however, should the user wish to fill a hand application bottle using bottle filler 66, the user depresses diverter 64 which directs diluted solution from pump 60 into bottle filler 66 for refilling of a hand application bottle 98.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the inventive janitorial handcart and chemical application apparatus for cleaning and sanitizing is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

The invention claim is:

1. A portable janitorial cart system comprising:

(a) a primary janitorial cart formed by a primary cart frame and having floor engaging wheels, said primary cart being adapted for carrying cleaning supplies and tools; and (b) a secondary janitorial cart removably positioned on said primary cart, said secondary cart including:

(1) a secondary cart frame with floor engaging wheels to facilitate movement of said secondary cart independent of said primary cart;

(2) a reservoir positioned on said secondary cart and adapted to store a cleaning liquid;

(3) a spray tool fluidically communicating with said reservoir;

(4) a spray pump positioned on said secondary cart, fluidically communicating with said reservoir and said spray tool, and including a pump motor, said pump cooperating with said reservoir and said spray tool to propel said cleaning liquid from said reservoir and through said spray tool upon activation of said pump motor;

(5) a battery positioned on said secondary cart and selectively coupled to said pump motor to thereby activate said motor; and (6) a battery charger unit positioned on said secondary cart and coupled to said battery to enable recharging said battery by connection of said charger unit to an external source of electrical power.

2. The portable janitorial cart system of claim 1 wherein said reservoir is a first reservoir and further comprising a second reservoir containing a second liquid for combination with said cleaning liquid.

3. The portable janitorial cart system of claim 2 further comprising a venturi tube in communication with said pump and said first reservoir and said second reservoir to dilute said cleaning liquid of said first reservoir with said second liquid of said second reservoir to provide a diluted chemical solution.

4. The portable janitorial cart system of claim 3 further comprising a diverter switch for directing diluted material to bottle filler spout.

5. The portable janitorial cart system of claim 2 further comprising a water level gauge for said second reservoir.

6. The portable janitorial cart system of claim 1 further comprising a plurality of reservoirs for a plurality of cleaning liquids.

7. The portable janitorial cart system of Claim 6 further comprising a selector switch for user selection among said plurality of cleaning liquids.

8. A portable janitorial cart system comprising:

(a) a janitorial cart frame with floor engaging wheels to facilitate movement of said cart;

(b) a reservoir positioned on said cart and adapted to store a cleaning liquid;

(c) a spray tool fluidically communicating with said reservoir;

(d) a spray pump positioned on said cart, fluidically communicating with said reservoir and said spray tool, and including a pump motor, said pump cooperating with said reservoir and said spray tool to propel said cleaning liquid from said reservoir and through said spray tool upon activation of said pump motor and said spray pump providing a pressure of less than approximately 130 PSI through said spray tool to avoid damage to a structure being cleaned as a result of high application pressure of said cleaning liquid;

(e) a battery positioned on said cart and selectively coupled to said pump motor to thereby activate said motor; and (f) a battery charger unit positioned on said cart and coupled to said battery to enable recharging said battery by connection of said charger unit to an external source of electrical power.

9. The portable janitorial cart system of claim 8 wherein said reservoir is a first reservoir and further comprising a second reservoir containing a second liquid for combination with said cleaning liquid.

10. The portable janitorial cart system of claim 9 further comprising a venturi tube in communication with said pump and said first reservoir and said second reservoir to dilute said cleaning liquid of said first reservoir with said second liquid of said second reservoir to provide a diluted chemical solution.

11. The portable janitorial cart system of claim 10 further comprising a diverter switch for directing diluted material to bottle filler spout.

12. The portable janitorial cart system of claim 9 further comprising a water level gauge for said second reservoir.

13. The portable janitorial cart system of claim 8 further comprising a plurality of reservoirs for a plurality of cleaning liquids.

14. The portable janitorial cart system of claim 13 further comprising a selector switch for user selection among said plurality of cleaning liquids.

15. The apparatus as claimed in claim 8 further comprising a diverter switchable between a first "on" position and a second "off" position said "on"position of said diverter redirecting flow of said diluted chemical solution to an outlet for attachment of a container thereto for filling of said container with said diluted chemical solution.

16. The portable janitorial cart system of claim 8 wherein said spray pump provides a flow rate of approximately one-half gallon per minute through said spray tool.

* * * * *